April 3, 1962     R. B. RANSOM     3,027,785
DRILL AND CENTERING DEVICE
Filed Sept. 9, 1960     2 Sheets-Sheet 1
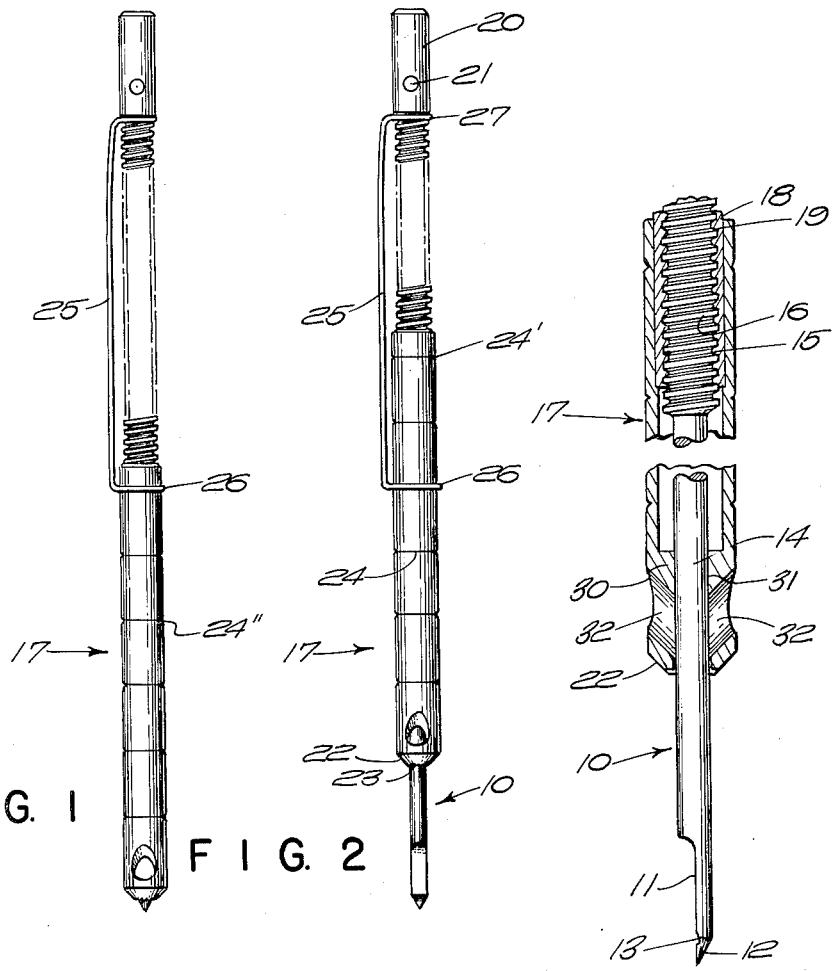
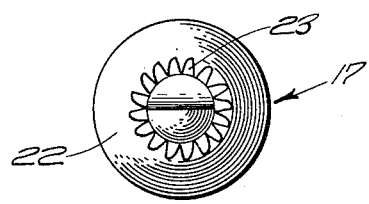
INVENTOR.
ROBERT B. RANSOM
BY
Barlow & Barlow
ATTORNEYS April 3, 1962 R. B. RANSOM 3,027,785
DRILL AND CENTERING DEVICE
Filed Sept. 9, 1960 2 Sheets-Sheet 2
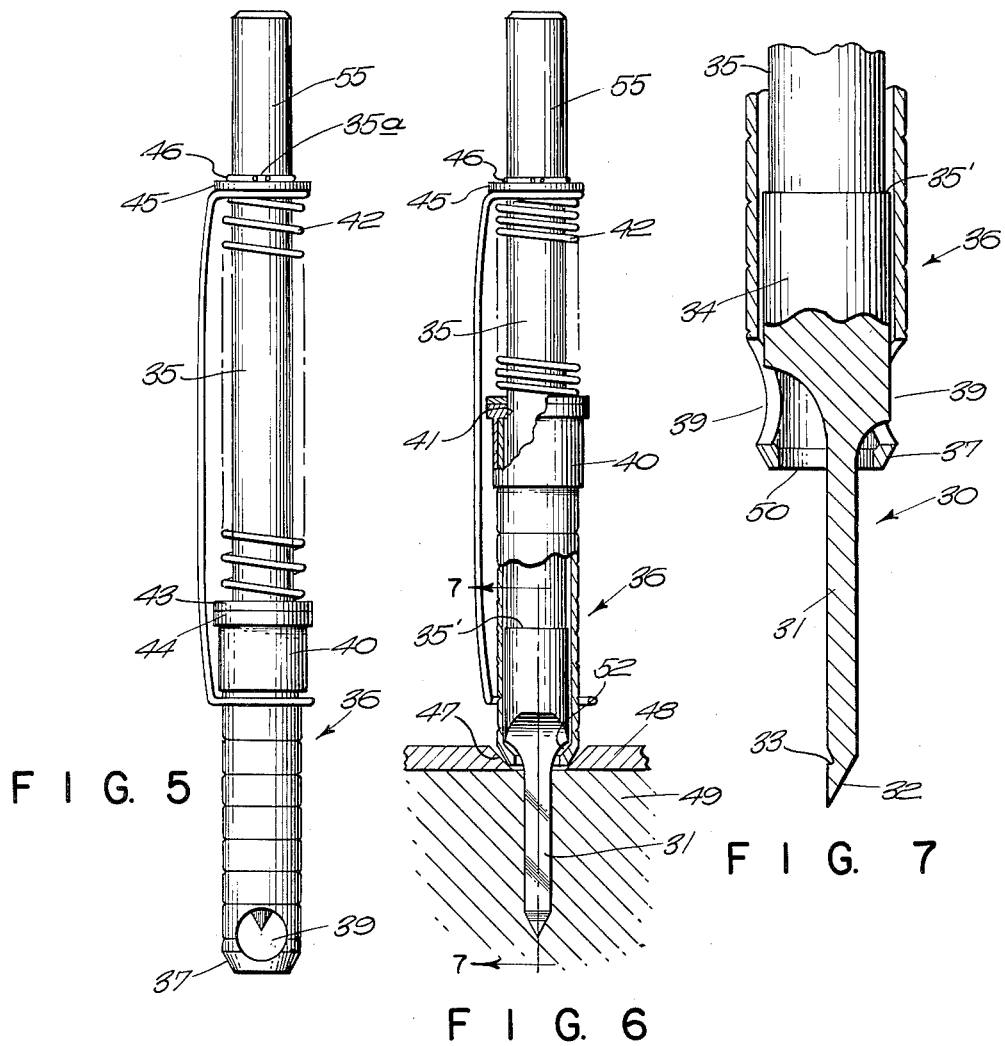
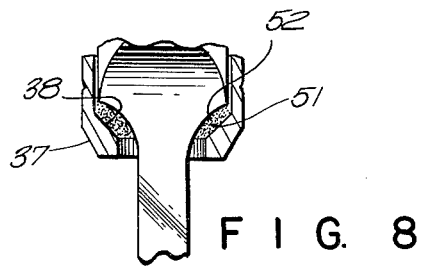
INVENTOR.
ROBERT B. RANSOM
BY
Barlow & Barlow
ATTORNEYS United States Patent Office 3,027,785
Patented Apr. 3, 1962

3,027,785
DRILL AND CENTERING DEVICE
Robert B. Ransom, Westerly, R.I., assignor to Norfolk Products Corporation, a corporation of Connecticut
Filed Sept. 9, 1960, Ser. No. 54,951
4 Claims. (Cl. 77—55)

This invention relates to a drill of the type used either for hand operation or small power operation and particularly to a means for centering the drill with respect to the work into which it is to enter.

In the use of a drill of this character in surgical use where it is necessary to drill a hole in the bone for putting together parts of a broken bone, it is difficult to start the drill in the location desired and some centering means to assist in starting the drill at the location desired would be useful. Also in the use of a drill for putting a screw into a hinge for a door or the like, it frequently is difficult to locate the screw hole at the true center of the opening in the hinge and some assistance is desirable.

One of the objects of this invention is to provide a means by which the drill may be more accurately located and centered with respect to surrounding parts of the work into which it is to be used.

Another object of this invention is to provide a centering device which will guide the drill in its advance.

Another object of this invention is to provide a centering device which may assist in the determination of the extent to which the drill has pierced the work.

Another object of this invention is to provide a centering device which may guide the drill and which may clear itself by operation of the drill from the accumulation of sawdust or chips which might pass into the centering device.

Another object of this invention is to provide a simple centering device which may be used with most any drill.

With these and other objects in view, the invention consists of certain novel features of construction as will be more fully described and particularly pointed out in the appended claims.

In the accompanying drawings:

FIGURE 1 is an elevation illustrating the drill and centering device with the drill in retract position;

FIGURE 2 is a similar view illustrating the drill as advanced through the centering device;

FIGURE 3 is a central sectional view of a fragmental portion of the drill and centering device;

FIGURE 4 is an enlarged end view of the drill and centering device;

FIGURE 5 is an elevation view in modified form of drill and centering device with the drill retracted;

FIGURE 6 is a view similar to FIGURE 5 partly in section illustrating the drill as advanced through the centering device to the limit of its extent;

FIGURE 7 is a fragmental section view on a larger scale and taken at substantially right angles to the showing in FIGURE 6, on substantially lines 7—7 of FIGURE 6;

FIGURE 8 is an enlarged fragmental sectional view illustrating the accumulation of chips in the lower part of the centering device.

In proceeding with this invention I have provided a tubular member through which the drill extends and have so shaped the leading end of the tubular member that it will enter a recess smaller than the diameter of the tubular member or may engage a flat or slightly depressed surface. The lower end is so shaped that when engaging a slightly depressed surface or small opening or hole, the inclined or tapered end will centralize the member and consequently the drill which extends through the member will be guided relative to this depressed or recessed surface so that as the drill is advanced its axial central point will enter at the center where it is desired the hole should be made. In some cases the end of the centering member may be serrated or toothed so as to prevent rotation of the member while the drill rotates in the member, and in other cases the member may be provided with an opening adjacent its lower end for the discharge of chips where the tool is used for wood drilling. I have provided a thread arrangement between the member and drill for such drilling as may occur in bone or the like or there may be an axial movement by axial reciprocation controlled by the action of a spring where wood is being drilled. In either case there may be a gauge provided which will attach to the drill and which may indicate the depth that the drill has extended into the work being bored by reason of the amount that the end of the gauge has extended along the tubular guide as the drill is advanced with reference thereto. In some cases it may be desirable to provide a means of clearing an accumulation of chips between the drill and the tubular member which may readily be done by a portion of the drill for operating upon the chip residue to release the same for discharge through an opening in the tubular member.

With reference to the drawings 10 designates a drill which in the present instance is provided at its leading end with a cut-away portion 11 so as to leave remaining substantially one half of the cylindrical end portion of the drill while it has a half conical pointed end 12 which in the present instance is provided with a recess 13 for the removal of chips or portions which may have accumulated by reason of the action of the drill upon the work being drilled and the accumulation building up in the recessed portion 11.

The shank 14 of this drill is generally cylindrical and fits tightly within a sleeve 15 which is provided with threads 16, while at its upper end portion there is a cylindrical end part 20 which may be engaged by a chuck of some tool for rotating the same. A recess 21 may be provided in this part 20 into which some part of the chuck may extend for a better grip.

The tubular centering guide which is designated generally 17 and is provided with a bushing 18 at its upper portion which has internal threads 19 for engagement with the threads 16 of the enlarged portion of the shank. This bushing 18 has a snug or tight fit with the centering member 17 so as not to rotate therein and permits the tube 17 to be removed for cleaning or the bushing to be changed as occasion requires should wear occur. The lower or leading end of this tubular centering member 17 is tapered as at 22 on its outer surface inwardly which taper terminates in an arrangement of circular serrations or teeth 23 so that if the end of the centering member engages some part of the work, it will get a good grip thereon and stop rotation to permit the drill to be advanced by its threads through the tube 17 for further penetration. The taper 22 engaging a counter sink will also serve the same purpose.

In order to guide the drill 10 at its lower end, the tubular centering guide 17 is provided with a solid portion 30 or a bushing having a bore 31 of a size to provide a bearing for the cylindrical portion of the shank 14 and this bearing 31 extends for an axial length substantially the axial length of the cut-away portion 11 so that as soon as the conically pointed end 12 emerges from the tubular guide 17 the completely cylindrical portion 14 of the shank will find a bearing support in this bearing 31 so as to guide the drill as it moves forwardly from the tubular centering guide.

Any material which may be severed as the drill enters the work and which may find its way up into the tube 17 will be forced out of the tubular member 17 through diametrically opposite openings 32 which are provided so that the bearing 31 will not be clogged.

Along the outer surface of the centering member 17 there are markings or indicia 24 at spaced intervals which graduations will cooperate with an indicator 25 which is a wire having a loop 26 thereon and to loosely extend about the member 17 while it is provided with a spring loop 27 at its upper end to grip in the space between the threads and the cylindrical part 20 so as to permit relative rotation of the drill and this indicator 25 although causing the indicator to move axially as the drill is advanced axially by rotation with reference to the centering member 17. As shown in FIGURE 1 the indicator 26 is at the upper indicia 24′ (see also FIGURE 2) with the drill retracted into the centering member 17 while in FIGURE 2 the drill is advanced in the centering member and the loop 26 is at mark 24″ (see FIGURE 1) showing that the drill extends the distance between the indicia or mark 24′ and the mark 24″. It is convenient that these graduations be one half inch apart thus indicating in FIGURE 2 the advancement of the drill one inch beyond the end of the centering device 17.

In FIGURES 5 to 8, a modified form of device is here provided. In this showing the drill designated generally 30 has a flat surface 31 with a half conical pointed end 32 with a cutout chip removing notch 33 and a generally cylindrical shank 34 which is reduced slightly as at 35 so as to provide a shoulder 35′. A recess 35a is also provided along its reduced portion 35.

The centering device is designated generally 36 and is a tubular form with a tapered end 37 generally frustro conical or slightly rounded and spherical on its outer surface while its inner surface 38 substantially follows the outer surface as shown in FIGURE 8. Diametrically opposite openings 39 are provided just above or partly intersecting this tapered surface 37 so that any chips which may enter the tubular member 36 will pass out through these openings 39.

The upper end of this tubular member 36 frictionally engages a collar 40 by telescoping into the same. This collar extends inwardly as at 41 so as to engage shoulder 35′ of the drill and limit upward movement of the drill with reference to the collar and its centering guide 36. A spring 42 encircles the drill portion 35 and abuts at one end on washer 43 which engages the end 44 of the collar 40 urging it against the shoulder 36 while at the other end there is a washer 45 which engages spring ring 46 in recess 35a of the drill so that the helical spring tends to force the collar 40 toward the pointed end of the drill along the shank thereof.

In operation the upper reduced end 35 of the drill designated 55 may be gripped in the jaws or chuck of some rotating tool and the centering device 36 may be placed in the chamfered opening 47 of a metal hinge 48 for locating the drill in the center of the opening in wood 49 upon which the hinge rests, then by rotation of the drill and pressure the drill will be advanced into the wood 49 at the center of the opening 47. As the drill advances into the opening, chips may pass up through the open end 50 of the centering device 36 and accumulate as at 51 in FIGURE 8 within the centering device along the surface 38. This might cause annoyance were it not for the fact that the edges 52 of the drill as seen in FIGURE 8 are so shaped that they will engage and cut away this accumulation so that the chips may pass out through the openings 39.

I claim:

1. A drill and centering device therefor comprising a drill having a point and a shank extending therefrom of two different diameters providing a shoulder, a tubular member engaging the larger diameter and guiding the drill while the smaller diameter may extend outwardly through the open end of the member, the outer surface of the open end portion of the member being tapered to enter a recess of a size smaller than the outer diameter of the member and center the member in said recess and thus center the drill for projection into the recess said member also being tapered on its inner surface at the open end portion to engage said shoulder and said drill being provided with a cutting edge at said shoulder to clear the inside taper from a collection of chips.

2. A drill and centering device therefor comprising a drill having a point and a shank extending therefrom of two different diameters providing a shoulder, a tubular member engaging the larger diameter and guiding the drill while the smaller diameter may extend outwardly through the open end of the member, the outer surface of the open end portion of the member being tapered to enter a recess of a size smaller than the outer diameter of the member and center the member in said recess and thus center the drill for projection into the recess, the larger diameter of said shank being threaded and said member being internally threaded for advancing the drill by a relative rotatory movement of the drill and member.

3. A drill and centering device as in claim 2 wherein the end of said member is serrated to hold the same against rotation.

4. A drill and centering device therefor comprising a drill having a point and a shank extending therefrom of two different diameters providing a shoulder, a tubular member engaging the larger diameter and guiding the drill while the smaller diameter may extend outwardly through the open end of the member, the outer surface of the open end portion of the member being tapered to enter a recess of a size smaller than the outer diameter of the member and center the member in said recess and thus center the drill for projection into the recess, said member being provided with indicia and an indicator rotatably secured to said drill against relative axial movement overlying the indicia on said member.

References Cited in the file of this patent

UNITED STATES PATENTS

| | | |
|---|---|---|
| 2,224,480 | Kartarik | Dec. 10, 1940 |
| 2,294,303 | Jagow | Aug. 25, 1942 |
| 2,338,765 | Hartman | Jan. 11, 1944 |